United States Patent [19]

Naifeh et al.

[11] 3,830,527
[45] Aug. 20, 1974

[54] ALIGNING APPARATUS

[75] Inventors: Sam C. Naifeh; James C. Coates, both of Orange, Tex.

[73] Assignee: Phillips Petroleum Company, Bartlesville, Okla.

[22] Filed: Aug. 4, 1972

[21] Appl. No.: 277,869

[52] U.S. Cl. .................................. 285/31, 285/175
[51] Int. Cl. ............................................ F16l 21/00
[58] Field of Search ................ 285/31, 32, 175, 302

[56] References Cited
UNITED STATES PATENTS
1,681,381  8/1928  Tolman .................................. 285/31
3,180,659  4/1965  Vigneron .......................... 285/175 X Primary Examiner—J. Karl Bell

[57] ABSTRACT

An apparatus for maintaining adjacently positioned ends of first and second conduits axially aligned and for moving said conduits along their axis. At least a pair of threaded shafts each extend through supporting tubes that are fixedly attached to a respective conduit. The shafts are threaded in opposed directions at each end portion thereof with the threads of each end portion mating with respective thread means fixedly associated with respective supporting tubes.

4 Claims, 3 Drawing Figures

ALIGNING APPARATUS

It is desirable to provide an apparatus for maintaining adjacently positioned ends of first and second conduits axially aligned and for moving said conduits along their axis. An example use of the apparatus could be where blind flanges are desired to be intermittently positioned between adjacently positioned first and second conduits for preventing the flow of material from one conduit into the other conduit. One such location could be on conduits associated with bag filters of a carbon black plant.

Other aspects, objects, and advantages of the present invention will become apparent from a study of the disclosure, the appended claims, and the drawings.

The drawings are diagrammatic views of the apparatus of this invention installed on first and second conduits.

Figure 1:
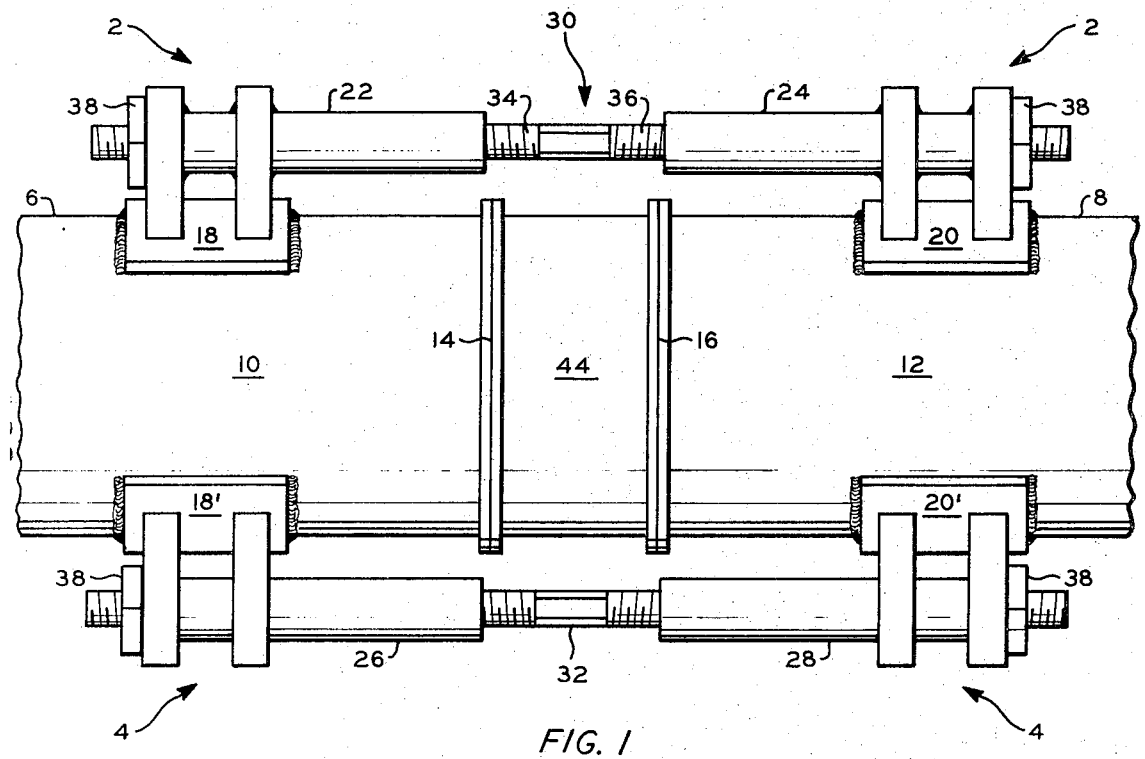
FIG. 1 shows the apparatus installed on first and second conduits.
Figure 2:
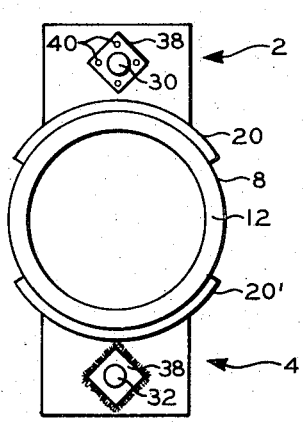
FIG. 2 shows an end view of the apparatus and the conduit.

Referring to FIGS. 1 and 2, first and second anchor pairs 2, 4 are fixedly attached to the outer walls 6, 8 of first and second conduits 10, 12 which have adjacent ends 14, 16 which are desired to be moved relative one to the other while maintaining said conduits 10, 12 axially aligned relative one to the other. Each anchor pair 2, 4 consists of first and second anchors 18, 18' and 20, 20'. Each anchor is fixedly attached to the outer wall of a respective one of the conduits 10, 12 at locations spaced from the ends 14, 16 of the conduits 10, 12. The first anchors 18, 18' and the second anchors 20, 20' are each generally spaced common arcuate distances from one another in order that each anchor pair extend along the conduits 10, 12 in a direction generally parallel to the common axis of the conduits in the installed position of the apparatus on the conduits.

A separate supporting tube 22, 24, 26, 28 is fixedly attached to and extends through each anchor 18, 18', 20, 20' and along the respective conduit 10 or 12 with the tubes 22, 24 or 26, 28 of each anchor pair 2 or 4 being in axial alignment one with the other.

At least one threaded shaft 30 or 32 is provided for each anchor pair 2, 4. Each shaft 30, 32 has first and second end portions 34, 36 that are threaded in opposed directions. Each of the threaded end portions 34, 36 of a shaft 30, 32 rotatably extends through a respective supporting tube 22, 24 26 or 28 of an anchor pair 2, 4.

A threaded nut 38 for example is fixedly attached to each anchor 18, 18', 20, 20' with the threads of the nut receiving and being matable with the threads of the associated shaft portion. The nut 38 can be attached to its respective anchor by for example welding the nut thereto or providing other fastening means such as bolts or screws 40.

Figure 3:
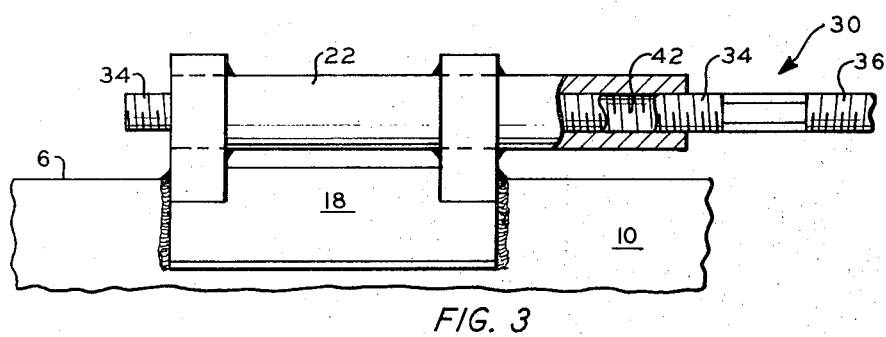
FIG. 3 shows another embodiment of the apparatus.

FIG. 3 shows another embodiment where the thread means associated with the shaft portions are threads 42 formed on an inner surface of the supporting tubes 22, 24, 26, and 28.

In order that the supporting tubes 22, 24, 26, 28 are sufficiently rigidly maintained relative to their associated conduits, it is recommended that each anchor 18, 18', 20, 20' extends along its respective conduit a distance of at least two-thirds of the diameter of the conduit to which connected and each supporting tube attachment to its anchor span a length of the tube of at least one-half of the diameter of the conduit with which associated. At lengths less than about 6 inches, the supporting tubes may not sufficiently maintain the shaft 30, 32 for preventing the conduits 10, 12 from moving to positions at which they are not coaxially aligned.

In the operation of the apparatus installed on the first and second conduits, the shafts are rotated in one direction for spreading the conduit ends 14, 16 apart for removing or inserting a spool 44 and then in the opposite direction for moving the conduits toward one another and into engagement with another spool, for example. Blind flanges, orifices for gas measurement, etc., can also be installed. During movement of the conduits, said conduits are maintained in axial alignment, thereby avoiding the difficulties encountered and the labor and equipment expenditure necessitated in moving conduits from positions out of alignment into alignment.

Other modifications and alterations of this invention will become apparent to those skilled in the art from the foregoing discussion and accompanying drawings, and it should be understood that this invention is not to be unduly limited thereto.

What is claimed is:

1. An apparatus for maintaining adjacently positioned ends of first and second conduits axially aligned and for moving said conduits along their axis, comprising:
   at least a pair of first and second anchors fixedly attached to the outer walls of the respective first and second conduits at locations spaced from the respective conduit ends, each said anchor extending along its respective conduit a distance of at least two-thirds of the diameter of the conduit to which it is connected;
   a separate supporting tube fixedly attached to each said anchor and extending along the respective conduit with the supporting tubes of each anchor pair being in axial alignment one with the other, each said anchor spanning a length of the supporting tube of at least one-half the diameter of the conduit to which said anchor is attached;
   at least one shaft for each anchor pair, each shaft having first and second end portions threaded in an opposed direction and rotatably extending through the tubes of an anchor pair; and
   thread means associated with each anchor and being fixedly maintained relative thereto, each thread means being matable with the threads of a respective associated shaft portion.

2. An apparatus, as set forth in claim 1, wherein the thread means are threaded nuts fixedly attached to each of the respective anchors.

3. An apparatus, as set forth in claim 1, wherein the thread means are threads formed on an inner surface of each supporting tube.

4. An apparatus, as set forth in claim 1, wherein each supporting tube is at least about 6 inches in length.

* * * * *